United States Patent [19]
Coates

[11] Patent Number: 5,518,654
[45] Date of Patent: May 21, 1996

[54] LIGHT MODULATING MATERIAL COMPRISING POLYMER DISPERSED LIQUID CRYSTALS

[75] Inventor: David Coates, Poole, England

[73] Assignee: The Secretary of State for Defence in her Britannic Majesty's Government of the U.K. of Gt. Britain and Northern Ireland, London, England

[21] Appl. No.: 859,737

[22] PCT Filed: Dec. 13, 1990

[86] PCT No.: PCT/GB90/01947

§ 371 Date: Jun. 12, 1992

§ 102(e) Date: Jun. 12, 1992

[87] PCT Pub. No.: WO91/09092

PCT Pub. Date: Jun. 27, 1991

[30] Foreign Application Priority Data

Dec. 14, 1989 [GB] United Kingdom ............... 8928282

[51] Int. Cl.$^6$ .................. C09K 19/12; C09K 19/52
[52] U.S. Cl. ................. 252/299.66; 252/299.01
[58] Field of Search ............... 252/299.01, 299.66

[56] References Cited

U.S. PATENT DOCUMENTS

| | | | |
|---|---|---|---|
| 4,888,126 | 12/1989 | Mullen et al. | 252/299.5 |
| 4,890,902 | 1/1990 | Doane et al. | 359/196 X |
| 4,994,204 | 2/1991 | Doane et al. | 252/299.01 |
| 5,011,624 | 4/1991 | Yamagishi et al. | 252/299.5 |
| 5,312,563 | 5/1994 | Coates et al. | 252/299.66 |
| 5,323,251 | 6/1994 | Coates et al. | 359/51 |
| 5,344,587 | 9/1994 | Coates et al. | 252/299.66 |

FOREIGN PATENT DOCUMENTS

| | | |
|---|---|---|
| 0132377 | 1/1985 | European Pat. Off. . |
| 0313053 | 4/1989 | European Pat. Off. . |
| WO A 86/04081 | 7/1986 | WIPO . |
| WO A 89/06264 | 7/1989 | WIPO . |

Primary Examiner—Gary L. Geist
Assistant Examiner—C. Harris
Attorney, Agent, or Firm—Nixon & Vanderhye

[57] ABSTRACT

A light modulating material is disclosed, comprising a solid, light transmissive, polymeric matrix having dispersed within said matrix droplets of a liquid crystalline composition, wherein said composition is a mixture of at least 2 compounds, at least one of said compounds having general formula (I), where n is 1 or 2, the fluorine substituent(s) may be in any of the available substitution positions and $R^1$ is $C_{1-12}$ alkynyl, hydrogen, R, RO or RCO where R is alkyl or perfluoroalkyl and at least one other of said compounds having general formula (II), where m is 0 or 1 and $R^2$ is hydrogen or $C_{1-12}$ alkyl or alkoxy.

17 Claims, 1 Drawing Sheet

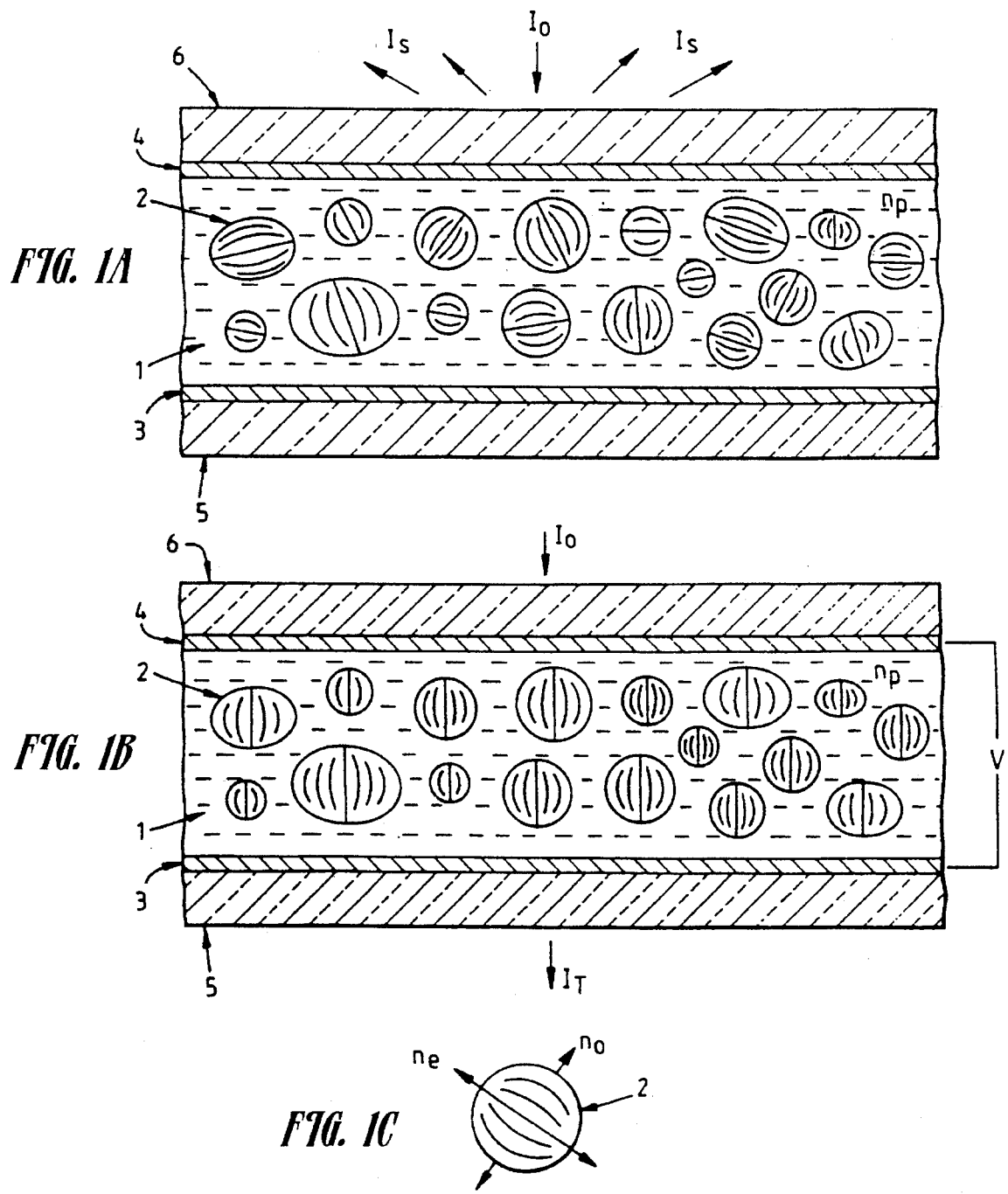

LIGHT MODULATING MATERIAL COMPRISING POLYMER DISPERSED LIQUID CRYSTALS

This invention relates to novel light modulating materials comprising a solid, light transmissive polymeric matrix having dispersed therein droplets of a liquid crystalline composition. The invention also relates to novel compositions suitable for use in such materials.

Liquid crystalline materials are widely used in liquid crystal displays such as watches, calculators etc. Most displays of this type consist of a thin film of a liquid crystalline composition sandwiched in a cell between two substrates, at least one of which is transparent, and having transparent electrodes on their inner surfaces. On applying a potential difference across the electrodes the alignment of the molecules of the liquid crystalline composition is altered, resulting in an electro-optical effect in the material, which is exploited by the display. Most often electro-optical effects in the nematic liquid crystal phase are exploited in such displays. Examples of types of such displays include the twisted nematic device, the Freedericksz effect device, cholesteric memory mode device, cholesteric to nematic phase change effect device, dynamic scattering effect device, two frequency switching effect device and the "supertwist" effect device.

There are problems in constructing a large, e.g. several square metres area, liquid crystal display device of the above type. For example, there are substantial engineering problems in simply constructing a large cell with a constant substrate spacing of typically 1–10 μm over its entire area. Moreover, as liquid crystal materials are fluid they may flow causing variations in the film thickness in the sandwich. Both of these problems result in variations in the appearance or quality of the display over a large area. Consequently most present liquid crystal displays are at most a few square centimetres in area.

Recently a new type of liquid crystal display material has been developed, in which droplets of a suitable liquid crystalline composition are dispersed in a solid, light transmissive polymeric matrix. In the art such materials are known generally as polymer dispersed liquid crystal (abbreviated "PDLC") materials and/or as non curvilinear aligned phase (abbreviated "NCAP") materials because of their construction and physics respectively. Light is scattered from such materials because of a mismatch between the refractive index of the droplets and the matrix. The director of the liquid crystals within the droplets has no preferred orientation but varies randomly from droplet to droplet in the absence of an electric field. The liquid crystal has a positive dielectric anisotropy and therefore aligns parallel to an applied electric field. When no field is applied incident light is efficiently scattered because of the mismatch of the refractive index of the droplets and the matrix. When a field is applied the alignment of the liquid crystal results in the droplets having an effective refractive index closer to the ordinary refractive index of the liquid crystal, $n_o$, for light incident normal to the material. The matrix has a refractive index, $n_p$, essentially equal to $n_o$ and therefore the material becomes transparent to incident light.

Such materials may be made into large area display devices, such as windows, privacy screens etc, without the problems mentioned above. The construction of such a device is described below and illustrated in FIG. 1 of the accompanying drawings. Further references to such materials and devices are found in Mol. Cryst. Liq. Cryst. Inc. Nonlin. Opt. (1988) 157 427–441, Liquid Crystals (1988) 3(11) 1543–1559, FR 2.139.537, U.S. Pat. No. 4,435,047 and U.S. Pat. No. 4,688,900.

To date, only a limited range of compounds have been used in compositions for PDLC materials. The references mentioned above only refer to the use of benzylidineanilines, 4-alkyl or alkoxy 4'-cyanobiphenyls or 4"-cyanoterphenyls, alkyl or alkoxy cyanophenylcyclohexanes or cyanobiphenylcyclohexanes, and aromatic esters in these compositions.

There is clearly scope for development of new liquid crystal compositions for PDLC materials. Although many types of compound and composition are known which are suitable for use in the small area display devices discussed above, these compounds and compositions are not necessarily suitable for use in PDLC materials in view of their particular requirements as described below.

The ordinary refractive index $n_o$ of the composition should match or be similar to the refractive index of the polymer matrix, so that in the presence of an applied field the material becomes as transparent as possible to incident light, preferably $n_o$ being less than around 1.5. Further desirable characteristics of the liquid crystal composition are a high birefringence, Δn, a high nematic to isotropic transition temperature T(N-I) and a low threshold voltage, Vth, for the potential difference of the field required to operate the material. In contrast =o small scale liquid crystal displays viscosity, η, is less critical. It is also desirable that PDEC compositions should use known and commercially available liquid crystal compounds, to minimise research effort in preparing them.

The inventors have unexpectedly discovered that certain laterally fluorinated 4-alkyl or alkoxy 4"-cyanoterphenyls may be mixed with other known liquid crystal compounds to provide exceptionally useful PDLC compositions. Some such terphenyls are disclosed in Mol. Cryst. Liq. Cryst. (May 1988) 158B 209–240, and in PCT/GB89/00647 (priority 16 Jun. 1988). Speculative disclosures of these terphenyls are also found in WO 86/04081 and GB 2039937A. In none of these publications is there any suggestion of suitability for use in PDLC compositions.

According to this invention a light modulating material is provided, comprising a solid, light transmissive polymeric matrix having dispersed within said matrix droplets of a liquid crystalline composition, wherein said composition is a mixture of at least two compounds, at least one of said compounds having a general formula I:

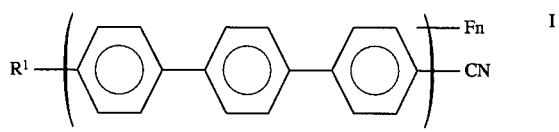

wherein n is 1 or 2, the fluoro substituent(s) may be in any of the available substitution positions and $R^1$ is $C_{1-12}$ alkynyl, hydrogen, R, RO or RCO where R is alkyl or perfluoroalkyl, and at least one other of said compounds having a general formula II:

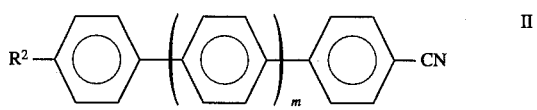

wherein m is 0 or 1 and $R^2$ is hydrogen or $C_{1-12}$ alkyl or alkoxy.

Preferably at least one compound of formula I in the composition in this material has a formula IA:

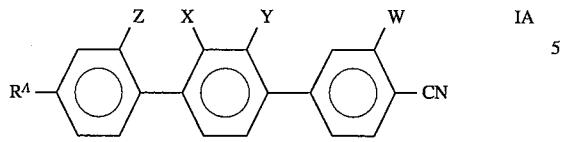

where any one of W, X, Y or Z is fluorine, and where $R^A$ is preferably alkyl or alkoxy. Of compounds of formula IA those where X is fluorine and/or where $R^A$ is a n-propyl are particularly preferred because of their high solubility in compounds of formula II, and compounds of formula IA in which W, Y or Z is fluorine are also preferred because their use in the composition helps to lower $V_{th}$ and to increase T(N-I) and Δn. This is generally true of all the PDLC materials and compositions discussed below.

In this material the composition may additionally include one or more compounds of formula III:

where $R^3$ is $C_{1-12}$ alkyl or alkoxy and l is 0 or 1. 1. The inclusion of compounds of formula III into the composition can lead to a high T(N-I), high Δn, and particularly a low $n_o$, and this is generally true of all the PDLC materials and compositions of the invention discussed below.

The invention also provides novel compositions suitable for use in PDLC materials of the type described above, which may be supplied already dispersed in the polymer matrix or alternatively may be supplied separately for subsequent dispersal in a polymer matrix.

One such composition of =his invention comprises one, two or more compounds of formula I, preferably at least one being a compound of formula IA, mixed with one or more compounds of formula II at least one of which has m being 0 and $R^2$ being ethyl, n-propyl, n-hexyl or hydrogen. The inclusion of one or more compounds of formula II with such termini is found to result in advantageous compositions having a lower $V_{th}$ and a higher Δn than for example if $R^2$ is n-pentyl, and this is generally true of all the PDLC materials and compositions of the invention discussed herein.

Further compositions of this invention include one or more compounds of formula I having a formula IB:

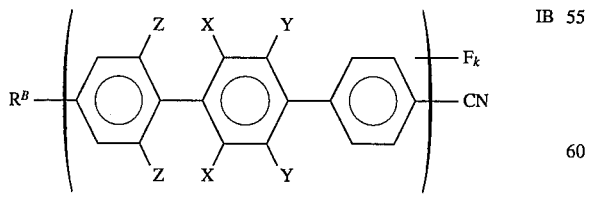

wherein $R^B$ is alkyl or alkoxy, k is 1 or 2 provided that when k is 2 the fluorine substituent(s) may occupy any of the substitution positions but if k is 1 then the fluorine substituent may only occupy the positions other than X, Y or Z, together with one or more compounds of formula II.

Preferred compounds of formula IB are those of formulae IB1 to IB5 below:

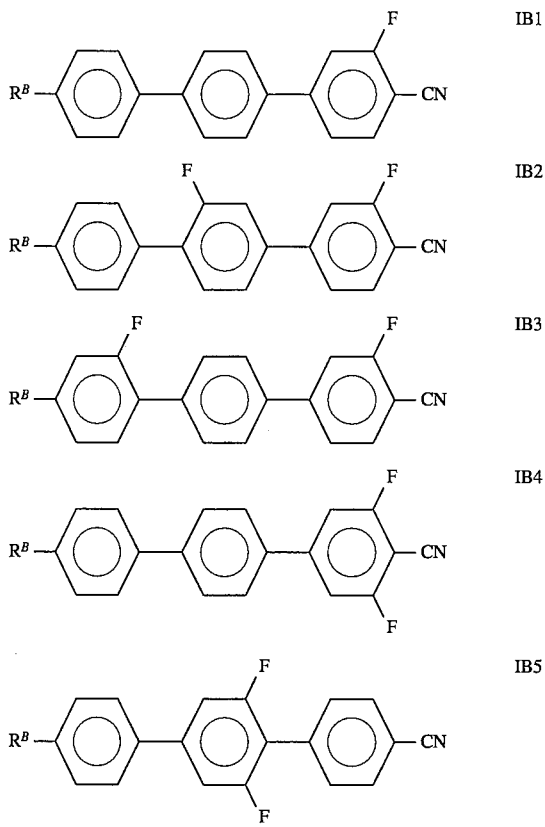

Especially preferred compounds of formula IB are those in which the fluorine substituent(s) point(s) towards the CN group, as this helps to lower $V_{th}$ and to increase T(N-I) and Δn.

In formulae I and II above $R^A$ and $R^B$ preferably contain 1–6 carbon atoms, and are preferably alkyl.

The compositions discussed above may contain two or more compounds of formula I, and these may be one or more compounds of formula IA, or one or more compounds of formula IB, or a mixture of one or more compounds of formulae IA and IB.

The compositions discussed above may also advantageously additionally contain one or more compounds having formula IV, V, VI or VII:

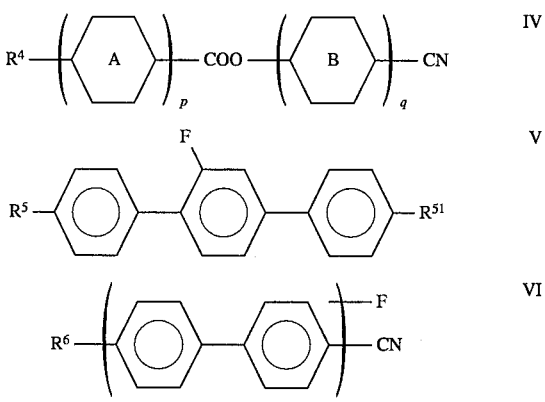

-continued

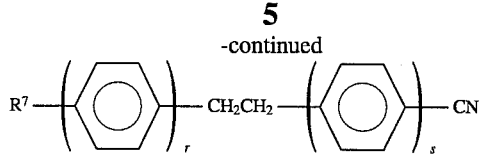

wherein each of $R^4$, $R^5$, $R^{51}$, $R^6$ and $R^7$ is independently $C_{1-12}$ alkyl or alkoxy; rings A and B are independently phenyl or cyclohexyl; p, q, r and s are each independently 1 or 2; and the fluorine substituent in VI may be in any of the available substitution positions.

Preferred compounds of formulae IV, VI and VII have formulae IVA, VIA and VIIA:

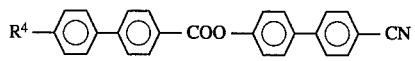

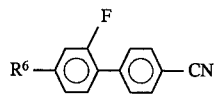

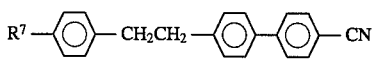

The inclusion of esters of formula IV can assist in achieving high T(N-I) mixtures having a high Δn. The inclusion of compounds of formula VI and/or VII can assist in achieving a lower $V_{th}$ and a high Δn. The inclusion of terphenyls of formula V can assist in reducing viscosity, yet retaining high T(N-I). Inclusion of compounds of formula VI can raise T(N-I) without increasing the UV absorbance at longer wavelengths.

The composition may also include one or more pleochroic dyes.

Typically a composition as described herein contains 5–50 weight % of terphenyls or formula I, especially 15–30 weight %. If the composition contains compounds of formula II having $R^2$ as ethyl, n-propyl, n-hexyl or hydrogen then typically these are present at 10–50 weight %. Compounds of formula III may typically be present to about 5–40 weight %. Compounds of formulae IV, V, VI and VII may be present to a maximum of about 30 weight %. Pleochroic dyes may typically be present up to about 1 weight %.

All of the compounds of formulae I to VII are known compounds which are either available commercially or may be made via literature routes, and compositions using them may be made using conventional liquid crystal mixing techniques. The selected compounds I to VII also enable a further desirable characteristic, i.e. high solubility in monomers and low solubility in the resultant polymers, which assists droplet formation.

The polymeric matrix used in the materials or with the compositions of the invention may be those commonly used in this art. Suitable polymers include epoxy resins including thermosetting and thermoplastic epoxy resins, UV cured polymers, polyvinyl polymers such as polyvinyl alcohol, polyacrylates such as polymethylmethacrylate, polyurethanes, polyesters and polyarylalkenes such as polystyrene. Preferred polymers are the epoxy resin which is a mixture of epichlorohydrin and bisphenol A and a curing agent, the polyurethane which is a mixture based on toluene diisocyanate, polyether glycols, methylenebisisoorthochloroaniline and various polyols, polymethylmethacrylate and polyvinyl alcohol. Typically materials of the invention contain 15–90% by weight of the composition, preferably 30–80%.

Materials according to the invention may be made using such polymers and the compositions described using known techniques, such as polymerization induced phase separation (PIPS), thermally induced phase separation (when the polymer is thermoplastic and can be melted) (TIPS), and solvent induced phase separation (SIPS). The use of these three basis techniques is for example described and illustrated in Mol. Cryst. Liq. Cryst. Inc. Nonlit. Opt (1988) 157 427–441. This publication also describes methods of controlling droplet size, which is typically around the wavelength of the incident light, i.e. 1–10 μm, and density droplets $cm^{-3}$).

Using other known techniques, the alignment of the director of the liquid crystal composition forming the droplets may be controlled as the material is formed, so that even when no electric field is applied to the material the director is oriented in a desired direction by surface interactions at the droplet-matrix interface. For example if the material is in the form of a sheet or film the directors may be oriented parallel to or normal to the plane of the sheet. This may be achieved for example in known ways by straining the sheet, or applying an electric field whilst the material is being formed.

The invention also provides an electro-optical light modulating device comprising a film of a material as described above typically 5–50 μm thick, having electrodes on opposite faces of the film by means of which an electric field may be applied, at least one of said electrodes being light transmissive. A suitable material for these light transmissive electrodes is indium tin oxide. Conveniently the device may be mounted for strength on a substrate or between two substrates at least one of which is optically transmissive. Such substrates may for example be made of glass or a transparent plastics material which may be flexible. Such devices may for example be used as windows, privacy screens, display signboards, traffic signs etc.

The invention will now be described by way of example only with reference to FIG. 1 which shows a cross section through a device of the invention which incorporates a material of the invention.

EXAMPLE 1

Light Modulating Device

Referring now to FIG. 1 a device of the invention consists of a film of a transparent solid polymeric matrix 1 having a refractive index $n_p$. Dispersed within the matrix 1 are droplets 2 of a liquid crystalline composition. The matrix 1 with dispersed droplets 2 is sandwiched between two transparent indium tin oxide electrodes 3, 4 which are themselves mounted on the surface of two transparent glass substrates 5, 6.

Within the droplets 2 the director of the liquid crystal is oriented as a result of surface interactions between the liquid crystal and the polymer matrix 1 of the droplet—matrix interface.

The liquid crystal composition has an ordinary refractive index $n_o$ normal to the director and an extraordinary refractive index $n_e$ parallel to the director. The extraordinary refracture index $n_e$ is similar to the refractive index $n_p$ of the matrix, but there is a mismatch between $n_o$ and $n_p$. When there is no electric field across the film 1, as in FIG. 1A, the directors of the liquid crystal droplets 2 are randomly oriented, and incident light $I_o$ is scattered as scattered light $I_s$ because of the mismatch between $n_o$ and $n_p$. Appearance of the device is therefore opaque milky white.

When an electric field is applied across the film 1 as in FIG. 1B by applying a potential difference V between the electrodes 3, 4 the directors of the liquid crystal droplets align parallel to the direction of the field. The retractlye indices $n_p$ and $n_o$ match and the device becomes transparent, transmitting incident light $I_o$ as transmitted light $I_T$.

EXAMPLE 2

Compositions

Various compositions according to this invention are listed below. The proportions of the compound are given in weight %. All alkyl and alkoxy groups shown are n-alkyl or n-alkoxy. T(C-N) is the solid to nematic liquid crystal melting point.

Composition 1

| Compound | Proportion |
|---|---|
| $C_3H_7$—⟨⟩—⟨F⟩—⟨⟩—CN | 20.0 |
| $C_2H_5$ / $C_3H_7$ / $C_5H_{11}$ / $C_3H_7O$ —⟨⟩—⟨⟩—CN | 13.34 / 4.45 / 32.89 / 9.78 |
| $C_7H_{15}$—⟨⟩—⟨⟩—COO—⟨⟩—⟨⟩—CN | 6.2 |
| $C_5H_{11}$—⟨cy⟩—⟨⟩—⟨⟩—CN | 13.34 |

T(N-I) 104.5° C.
T(C-N) not frozen
Δn 0.273
η20 62.9 c St

Composition 2

| Compound | Proportion |
|---|---|
| $C_3H_7$—⟨⟩—⟨F⟩—⟨⟩—CN | 23.0 |
| $C_2H_5$ / $C_3H_7$ / $C_5H_{11}$ / $C_8H_{17}O$ —⟨⟩—⟨⟩—CN | 11.0 / 10.0 / 41.5 / 4.5 |
| $C_4H_9$—⟨⟩—⟨F⟩—⟨⟩—$C_3H_7$ | 10.0 |

T(N-I) 74° C.
T(C-N) not frozen
Δn 0.257
η20 46.9 c St

Composition 3

| Compound | Proportion |
|---|---|
| $C_3H_7$—⟨⟩—⟨F⟩—⟨⟩—CN | 15.0 |
| $C_6H_{13}$ / $C_8H_{17}O$ / $C_5H_{11}O$ —⟨⟩—⟨⟩—CN | 31.0 / 7.0 / 10.0 |

Composition 3 -continued

| Compound | Proportion |
|---|---|
| $C_5H_{11}$—⟨⟩—⟨⟩—⟨⟩—CN | 5.0 |
| $C_5H_{11}$—⟨cy⟩—⟨⟩—CN | 12.0 |
| $C_5H_{11}$—⟨cy⟩—⟨⟩—⟨⟩—CN | 20.0 |

T(N-I) 104.6° C.
Δn 0.238
η20 72.2
$n_e$ 1.756
$n_o$ 1.518
$V_{th}$ 1.79 V

Composition 4

| Compound | Proportion |
|---|---|
| $C_3H_7$—⟨⟩—⟨F⟩—⟨⟩—CN | 20.0 |
| $C_8H_{17}O$ / $C_5H_{11}O$ / $C_3H_7O$ / $C_5H_{11}$ —⟨⟩—⟨⟩—CN | 15.0 / 12.0 / 5.0 / 30.0 |
| $C_5H_{11}$—⟨⟩—⟨⟩—⟨⟩—CN | 15.0 |
| $C_3H_7$—⟨⟩—$CH_2CH_2$—⟨⟩—⟨⟩—CN | 10.0 |

T(N-I) 99.2° C.
Δn 0.277

Composition 5

| Compound | Proportion |
|---|---|
| $C_3H_7$—⟨⟩—⟨F⟩—⟨⟩—CN | 20.0 |
| $C_5H_{11}$—⟨⟩—⟨⟩—⟨F⟩—CN | 10.0 |
| $C_2H_5$ / $C_5H_{11}$ —⟨⟩—⟨⟩—CN | 15.0 / 30.0 |

-continued
Composition 5

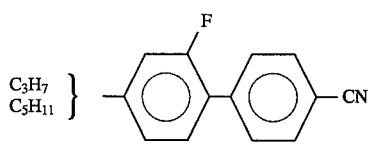

| | |
|---|---|
| C₃H₇ | 10.0 |
| C₅H₁₁ | 15.0 |

T(N-I) 62° C.
Δn 0.246
V$_{th}$ 1.26 V

Composition 6

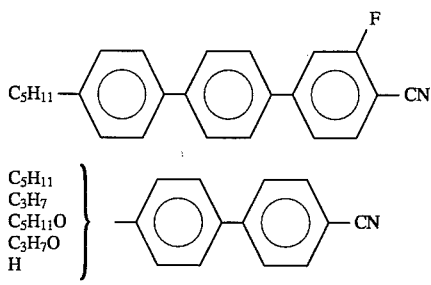

| | |
|---|---|
| C₅H₁₁ | 25.0 |
| | |
| C₅H₁₁ | 41.0 |
| C₃H₇ | 9.0 |
| C₅H₁₁O | 12.0 |
| C₃H₇O | 11.0 |
| H | 2.0 |

T(N-I) 73° C.
Δn 0.257
η20 62 c St
V$_{th}$ 1.30 V

Composition 7

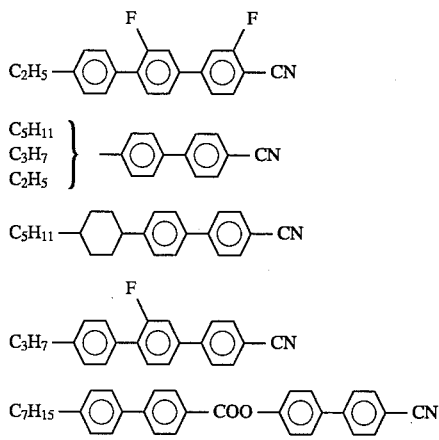

| | |
|---|---|
| C₂H₅ | 15.0 |
| C₅H₁₁ | 28.0 |
| C₃H₇ | 10.0 |
| C₂H₅ | 15.0 |
| C₅H₁₁ | 19.0 |
| C₃H₇ | 10.0 |
| C₇H₁₅ | 3.0 |

T(N-I) 101° C.
Δn 0.265

Composition 8

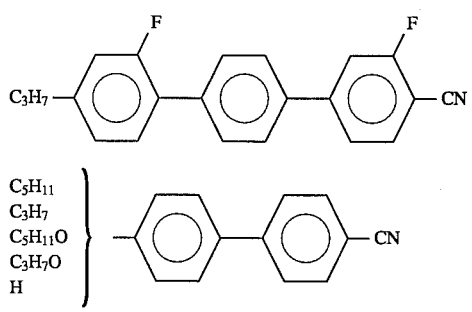

| | |
|---|---|
| C₃H₇ | 25.0 |
| C₅H₁₁ | 41.0 |
| C₃H₇ | 9.0 |
| C₅H₁₁O | 12.0 |
| C₃H₇O | 11.0 |
| H | 2 |

T(N-I) 61.4° C.

Δn 0.248
V$_{th}$ 1.14 V

EXAMPLE 3

Light Modulating Materials

Material 1

Polyvinyl alcohol (PVA) (Vinol 205, Air Products) was purified by Soxhlet extraction with Methanol prior to use. To 15 g of a 20 weight % aqueous solution of the PVA was added 5 g of a liquid crystal Composition 9:

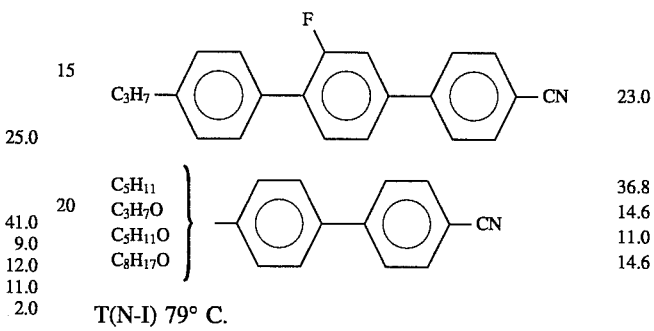

| | |
|---|---|
| C₃H₇ | 23.0 |
| C₅H₁₁ | 36.8 |
| C₃H₇O | 14.6 |
| C₅H₁₁O | 11.0 |
| C₈H₁₇O | 14.6 |

T(N-I) 79° C.
T(C-N) less than −20° C.
Δn 0.264
η20 68 c St

The PVA-Composition 9 mixture was emulsified using a laboratory stirrer, the droplet size then being measured using a Multisizer particle size analyser (Coulter Industries) as having a mean volume diameter of 3.3 um (1–7 um diameter range). After degassing the emulsion to remove bubbles, the emulsion was coated as thin layers onto indium tin oxide coated polyester film. After allowing to dry for one hour another sheet of the oxide-coated film was laminated on top of the dried emulsion, then the laminate was allowed to cure at 85° C. for a further 24 hours. The thickness of the laminate was around 10 um.

The method was repeated using the same PVA and a second Composition, 10:

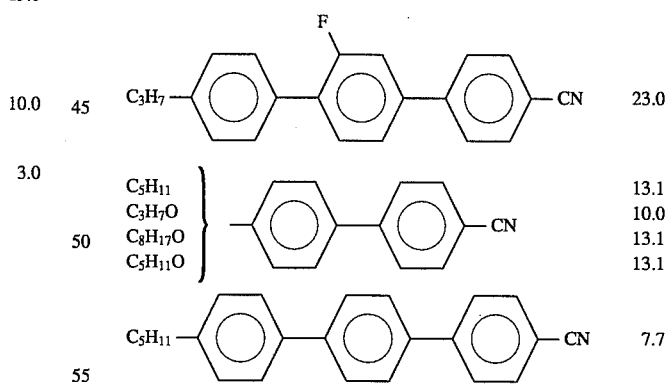

| | |
|---|---|
| C₃H₇ | 23.0 |
| C₅H₁₁ | 13.1 |
| C₃H₇O | 10.0 |
| C₈H₁₇O | 13.1 |
| C₅H₁₁O | 13.1 |
| C₅H₁₁ | 7.7 |

T(N-I) 93° C.
T(C-I) not frozen
Δn 0.278
η20 75.7 c St which was found to be equally effective at forming such materials. The method was further repeated using Compositions 1–8 above, with similar success.

Material 2

A thermosetting epoxy resin was formed by mixing Epon 828 (the reaction product of epichlorohydrin and bisphenol A) and Capcure 3-800 (a trifunctional mercaptan terminated liquid polymer), available from Shell and Miller Stephenson Company respectively. This liquid resin was made into a series of 2:1 by weight resin:composition mixtures with Compositions 1–10 above, which were then squeezed between glass slides coated with indium tin oxide on the surfaces of the slides in contact with the mixture to form a film about 25 um thick. The films were cured by heating between room temperature and 100° C.

Material 3

A thermoplastic epoxy resin was formed by mixing Epon 828 with one equivalent of hexamine. This resin was made into a series of 2:1 by weight resin:composition mixtures with Compositions 1–10 above. This mixture was cured at 70° C. for 12 hours to yield an opaque white solid which could be melted at 100° C. and formed into thermoplastic films between oxide coated slides as described above.

Material 4

A series of 1:1 by weight mixtures of powdered polymethylmethacrylate and Compositions 1–10 were prepared. Each mixture was dissolved in chloroform. The chloroform solution was poured over an oxide-coated glass slide as described above and the chloroform was allowed to evaporate, leaving a thin film of the material. A second slide was placed oxide surface down onto the film and made to adhere by pressure and heat.

I claim:

1. A light modulating material comprising a solid, light transmissive, polymeric matrix having dispersed within said matrix droplets of a liquid crystalline composition, wherein said composition is a mixture of at least 2 compounds, at least one of said compounds having the Formula I:

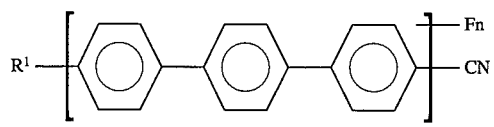

wherein n is 1 or 2, the fluorine substituent or substituents may be in any of the available substitution positions and $R^1$ is $C_{1-12}$ alkynyl, hydrogen, R, RO or RCO where R is alkyl or perfluoroalkyl, and at least one other of said compounds having the Formula II:

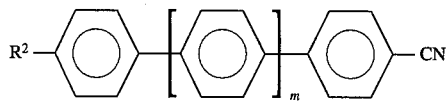

wherein m is 0 or 1 and $R^2$ is hydrogen or $C_{1-12}$ alkyl or alkoxy; provided that at least one of the compounds present given by formula I is given by the following formula:

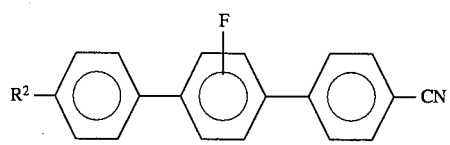

wherein

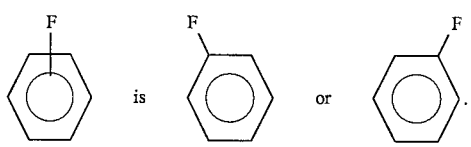

2. The material according to claim 1 wherein the compound of Formula I has the Formula IA:

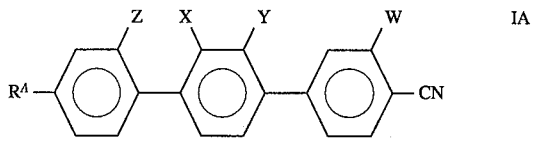

wherein $R^A$ is alkyl or alkoxy and any one of W, X, Y and Z is fluorine.

3. The material according to claim 2, wherein the composition additionally includes one or more compounds of the Formula III:

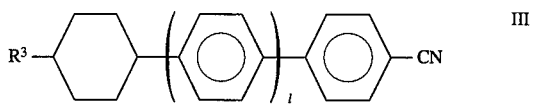

wherein $R^3$ is $C_{1-12}$ alkyl or alkoxy and l is 0 or 1.

4. The composition according to claim 1 wherein at least one of the compounds of Formula I has the Formula IB:

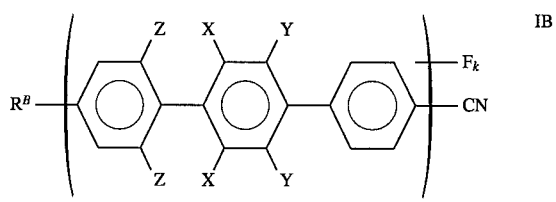

wherein $R^B$ is alkyl or alkoxy, k is 1 or 2, provided that when k is 2 the fluorine substituent or substituents may occupy any of the substitution positions, but if k is 1, the fluorine substituent may only occupy the positions other than X, Y and Z.

5. The composition according to claim 4, wherein at least one compound of Formula IB has the Formula IB1:

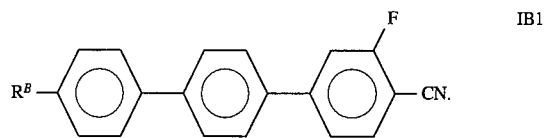

6. The composition according to claim 4, wherein at least one compound of Formula IB has the Formula IB2:

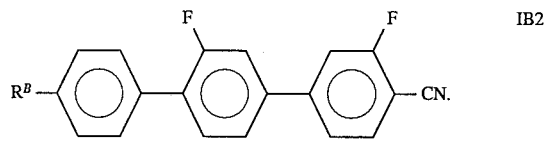

7. The composition according to claim 4, wherein at least one compound of Formula IB has the Formula IB3:

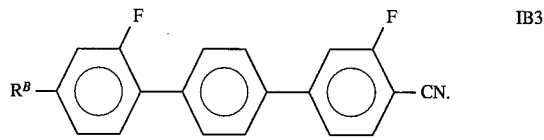

8. The composition according to claim 4, wherein at least one compound of Formula IB has the Formula IB4 or IB5:

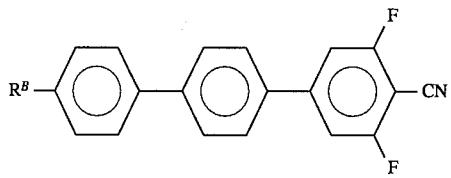

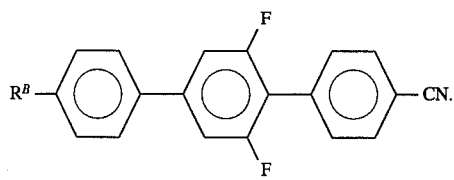

9. The composition according to claim 1 which contains 2 or more compounds of formula I.

10. The composition according to claim 4 wherein at least one compound of Formula I has a Formula IB and at least one compound of Formula II in which m is 0 and $R^2$ an ethyl, n-propyl, n-hexyl or hydrogen.

11. The composition according to claim 4, wherein the composition additionally includes one or more compounds of the Formula III:

wherein $R^3$ is $C_{1-12}$ alkyl or alkoxy and l is 0 or 1.

12. The composition according to claim 1 wherein said composition additionally includes one or more compounds selected from Formulae IV, V, VI, VII:

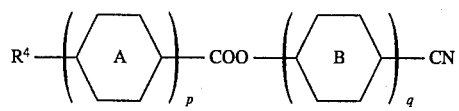

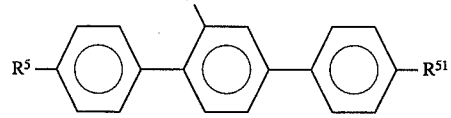

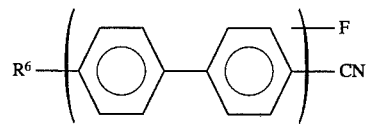

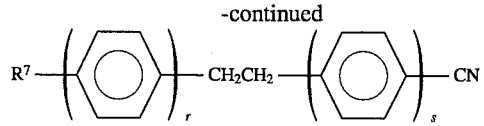

wherein each of $R^4$, $R^5$, $R^{51}$, $R^6$ and $R^7$ is independently $C_{1-12}$ alkyl or alkoxy; Rings A and B are independently phenyl or cyclohexyl; p, q, r, and s are each independent 1 or 2; and the fluorine substituent in VI may be in any of the available substitution positions.

13. The composition according to claim 12 wherein compounds of Formulae IV, VI and VII are selected from Formulae IVA, VIA and VIIA respectively:

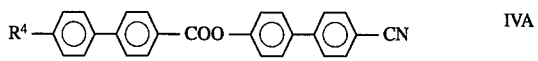

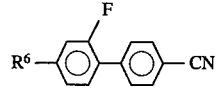

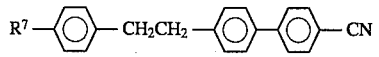

where $R^4$, $R^6$ and $R^7$ are as defined in claim 12.

14. The composition according to claim 10, wherein the amount of compounds of Formula II, where $R^2$ is ethyl-n-propyl, nohexyl or hydrogen, is between 10–50 weight %.

15. The composition according to claim 10, wherein the polymeric matrix is selected from the group consisting of epoxy resins, polyvinyl polymers, polyacrylates, polyurethanes, polyesters and polyarylalkenes.

16. The composition according to claim 1 wherein said mixture contains a compound of the formula:

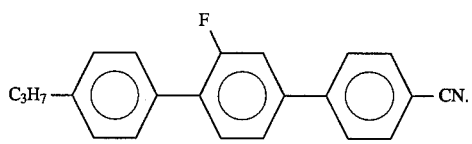

17. An electro-optical light modulating device comprising a film of light modulating material according to claim 1 of thickness between 5 μm and 50 μm, and electrodes on opposite faces of the film for application of an electric field, where at least one of the said electrodes is light transmissive.

* * * * *